March 10, 1931. C. L. EDDY 1,795,299
FOUR-WHEEL HYDRAULIC BRAKE
Filed July 24, 1925 3 Sheets-Sheet 2
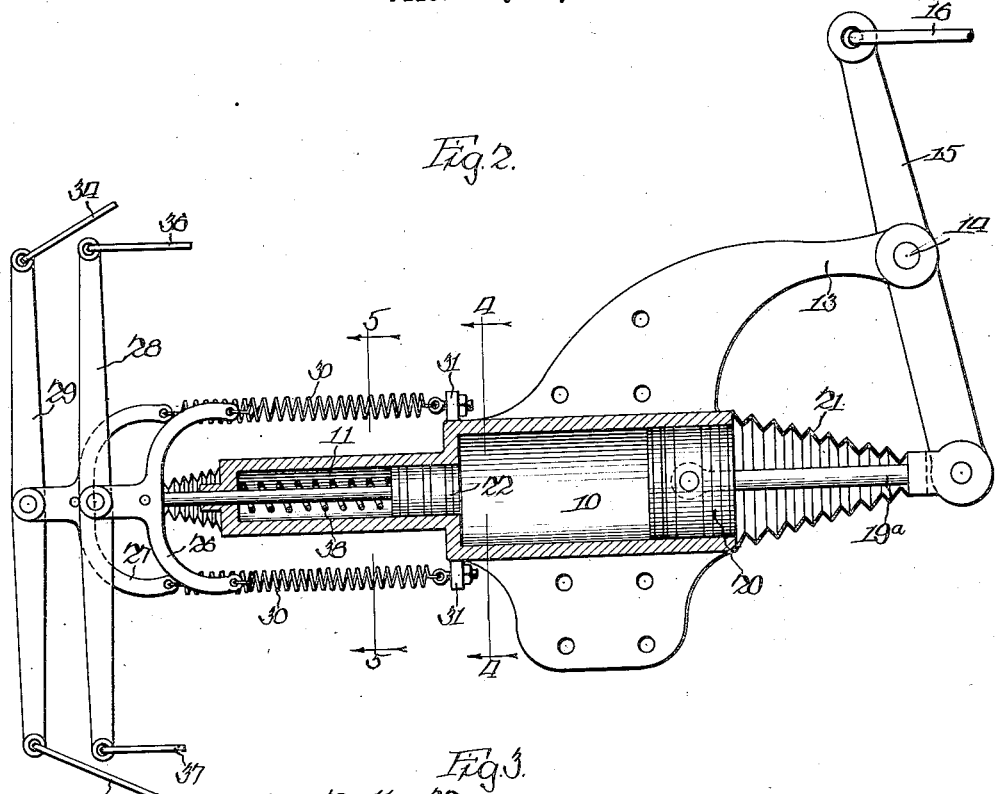
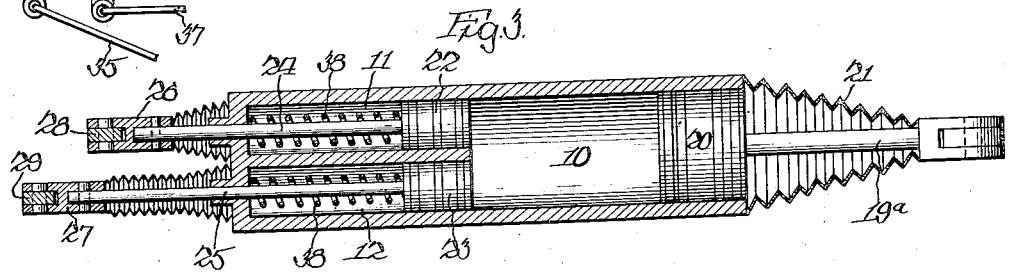
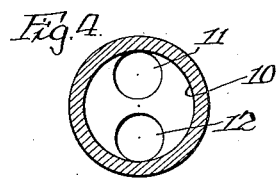
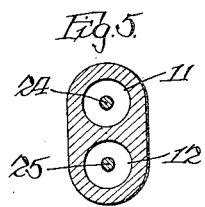
Inventor:
Carl Leon Eddy
By Chas. C. Tillman
Atty.

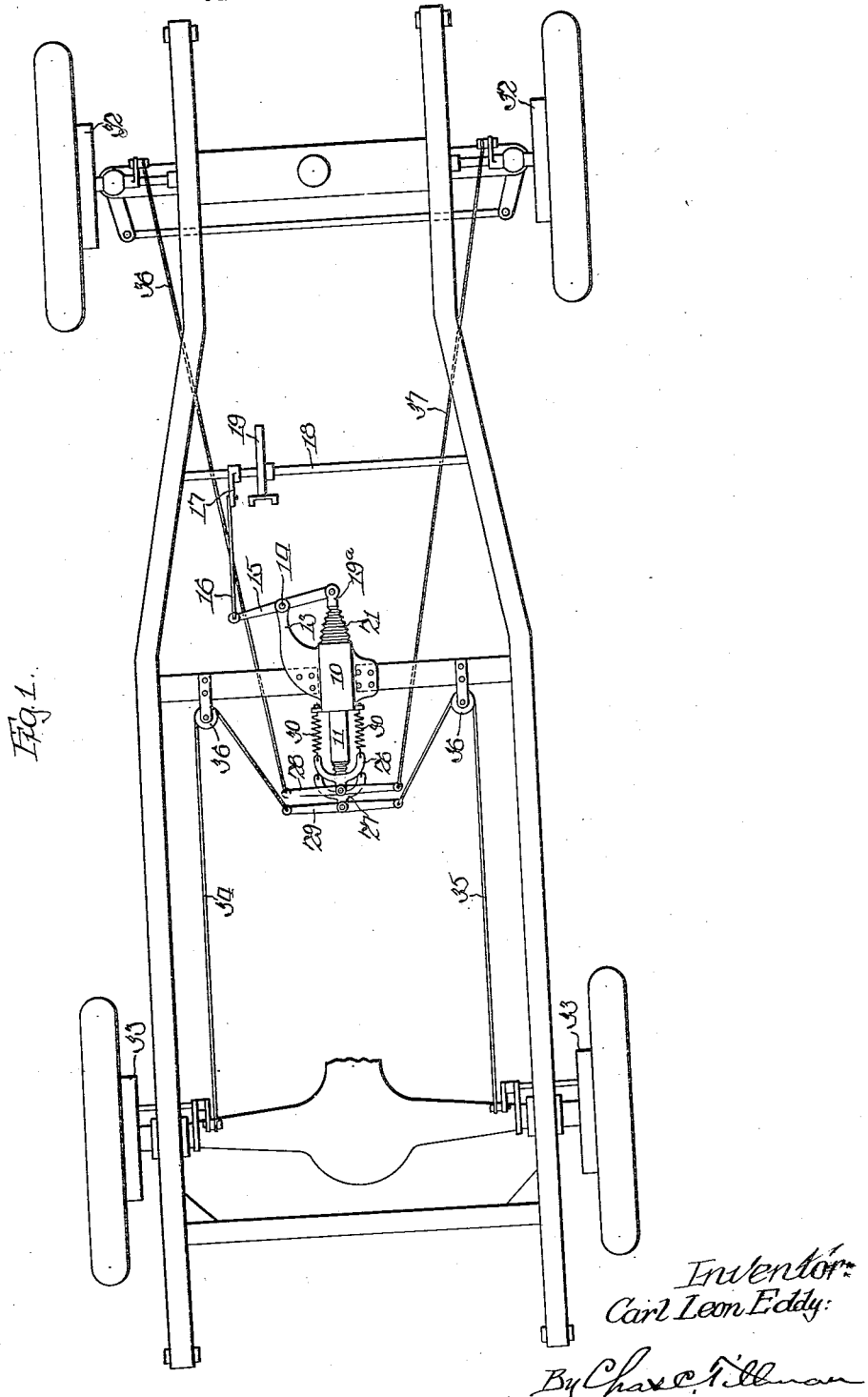

March 10, 1931.  C. L. EDDY  1,795,299
FOUR-WHEEL HYDRAULIC BRAKE
Filed July 24, 1925  3 Sheets-Sheet 3
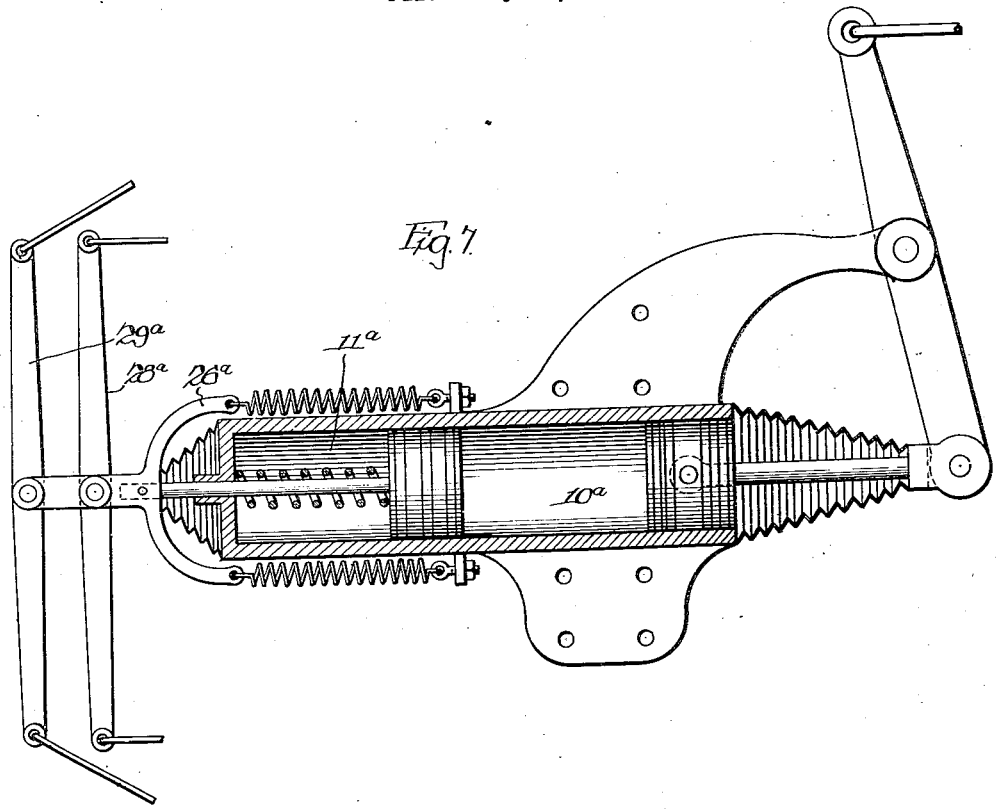
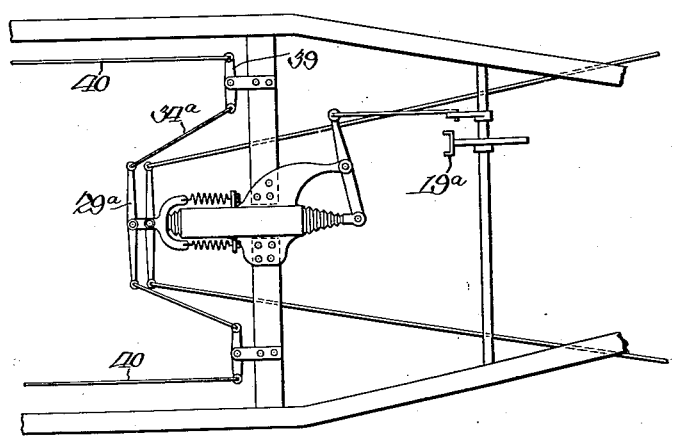
Inventor
Carl Leon Eddy
By Chas. E. Tillman
Atty.

Patented Mar. 10, 1931

1,795,299

UNITED STATES PATENT OFFICE

CARL LEON EDDY, OF CHICAGO, ILLINOIS

FOUR-WHEEL HYDRAULIC BRAKE

Application filed July 24, 1925. Serial No. 45,864.

The invention relates to hydraulically operated brakes for vehicles and has, as one of its objects, the provision of a construction of a unitary character whereby one or more pairs of brakes may be served by said unit to cause said pairs of brakes to be applied when it is desired to reduce the speed of the vehicle or bring the same to a stop.

The invention has as a further object the utilization of a plunger cylinder and a cylinder in which is located a piston under the control of the plunger, the piston being connected with the brakes of the vehicle, the cylinders being in direct communication with each other, thus eliminating passages, which are ordinarily of a restricted character, through which the liquid is compelled to travel before it can act to apply the brakes, the direct communication resulting in increasing the rapidity and force with which said brakes may be applied.

In addition to the above it is a further object to arrange the plunger and piston cylinders one at the end of the other so as to permit the direct communication between said cylinders.

It is a further object to provide a means for restoring the pistons and the plunger upon the release of the foot lever for actuating the plunger.

It is an added object to provide a construction which includes a pair of pistons under the control of a single plunger, each piston being connected with a pair of brakes, thus providing an arrangement whereby a four wheel brake device may result.

The invention has these and other advantages all of which will be explained in detail and more readily understood when read in conjunction with the accompanying drawings, which illustrate various structures which may be resorted to, it being therefore obvious that other arrangements may be resorted to without departing from the spirit of the appended claims forming a part hereof.

In the drawings,—

Figure 1 is a plan of the chassis of an automobile, showing the pressure brake applying mechanism mounted over and connected with brakes applied to each of the wheels of the vehicle.

Figure 2 is a sectional plan view of the pressure applying unit shown in Figure 1.

Figure 3 is a longitudinal sectional view of the device shown in Figure 2.

Figures 4 and 5 are respectively transverse sectional views taken on lines 4—4 and 5—5 of Figure 2.

Figure 6 is a plan view of a portion of the chassis of a figure similar to that illustrated in Figure 1, showing a pressure and brake applying unit of a modified construction applied thereto.

In Figure 7 is a sectional plan view of the structure illustrated in Figure 6.

The embodiment of the invention illustrated in Figures 1 to 5 includes a plunger cylinder 10 and piston cylinders 11 and 12, which are in direct communication with the plunger cylinder 10.

The casing of the plunger cylinder 10 is provided with an arm 13, to which is pivotally connected at 14 the lever 15. One end of the lever 15 is provided with a rod 16, which extends to a lever 17, secured to a rod 18 upon the latter of which is mounted a foot lever 19. The opposite end of the lever 15 is secured to a shaft 19ª of the plunger 20, the shaft 19ª is surrounded by a bellows 21 of suitable material, which surrounds the end of the plunger cylinder and has its opposite end connected to a portion of the shaft 19ª, and is provided to eliminate the possibility of dirt and dust finding its way into the interior of the cylinder 10. The piston cylinders 11 and 12, as before stated, are in direct communication with the piston cylinder 10, and have respectively mounted therein pistons 22 and 23, which, it is manifest, will be actuated upon the movement of the plunger 20 when force is applied to the brake lever 19. It is, of course, understood that fluid of any desired character is housed in the cylinder 10, and is caused to engage the pistons 22 and 23 to move same upon the actuation of the piston 20.

The pistons 22 and 23 are each respectively provided with a shaft 24 and 25, which extend beyond the ends of the piston cylinders 11 and 12, and each have secured thereto a yoke-shaped element respectively designated 26 and 27, each of which is connected to the pivoted elements 28 and 29. The yoke-shaped elements 26 and 27 are also connected through the medium of tension springs 30—30 to some suitable stationary portion, such as lugs 31—31, extending from the casing of the pressure and brake applying unit. The flexible elements are secured to the opposite ends of the pivoted elements 28 and 29, and are respectively secured to pairs of brakes, 32—32, 33—33. The flexible elements 34 and 35, which are secured to the pivoted element 29 extend over sheaves or pulleys 36′, and thus, as the piston 23 is actuated, the movement thereof will be transmitted to the brakes 33—33, to cause their application. The pivoted element 28 has flexible elements 36 and 37 extending therefrom to the brakes 32—32. It is manifest that upon the operation of the plunger 20, the pressure applied thereby to the fluid contained in the cylinder 10 is transmitted to the pistons and thence to said brakes 32—32, 33—33. By the utilization of the coil springs 30—30, and their connection with the yokes 26 and 27, it is manifest that should one of the flexible elements connected to the pivoted elements 28 and 29 be severed, that resulting side thrust applied to the shaft of either of the pistons 22 and 23 will be materially reduced, which will prevent binding of the opposite brake, and assist in reducing the friction between the parts and provide immediate release of the brakes.

A coil spring such as 38 may be arranged upon the shafts of the pistons to insure restoring the pistons to their original position.

It is manifest from the explanation of the structure that the piston cylinders 11 and 12 are in direct communication with the plunger cylinder 10, and thus the rapidity and force with which brakes may be applied is suitably augmented over a structure in which the compression and piston cylinders are connected through passages which lead from one to the other. In the modified structure illustrated in Figure 7, the compression cylinder 10ᵃ and the piston cylinder 11ᵃ are in axial alignment with each other. And the single element, such as 26ᵃ, provides the means to which both of the pivoted elements 28ᵃ and 29ᵃ are connected. In this arrangement, the pivoted element 29ᵃ is connected through the medium of the relatively short flexible element 34ᵃ to a pivoted member 39, to one end of which the latter flexible element 40 is connected, which leads to one of the brakes.

This structure also contemplates the use of a lever and rod, which is connected with a foot lever 19ᵃ corresponding to that previously explained.

From the foregoing description of the construction and operation of the device, it is manifest that a simple and inexpensive construction is provided whereby the speed of a vehicle may be reduced or brought to a stop through the medium of a fluid pressure applying unit, certain elements of which are independently operable, so that should one brake become inoperative for any reason, this will not interfere with the application of the second set of brakes. It is further manifest that the pressure cylinders and the piston cylinders are in direct communication with each other, which augments the speed and power or force with which the brakes may be applied. In addition to the above, it is also evident that the arrangement is such that should the connection between the pressure applying unit, and one of the brakes be rendered inoperable that this will not prevent the functioning of the other set of brakes, upon the operation of the pressure applying unit.

While I have shown and described the connecting elements 34, 35, 36, 37, 34ᵃ, and 40 as flexible, yet non-flexible ones may be used where needed.

Having thus fully described my invention, what I claim as new and desire to secure by Letters Patent is:—

1. In a brake mechanism, the combination of brakes and hydraulically actuated means for applying said brakes, said means including a lever and a plunger located in a cylinder, the plunger being connected with the lever, a pair of pistons operable by the actuation of said plunger, cylinders for said pistons opening directly into the first mentioned cylinder, and means connected with said pistons, said means providing a mechanical connection between said pistons and said brakes.

2. In a brake mechanism, the combination of brakes and hydraulically actuated means for applying said brakes, said means including a lever and a plunger located in a cylinder, the plunger being connected with the lever, a pair of pistons operable by the actuation of said plunger, cylinders for said pistons opening directly into the first mentioned cylinder, and means connected with said pistons, said means providing a mechanical connection between said pistons and said brakes, and means for restoring said pistons.

3. In a brake mechanism, the combination of brakes and hydraulically actuated means for applying said brakes, said means including a lever and a plunger located in a cylinder, the plunger being connected with the lever, a pair of pistons operable by the actuation of said plunger, cylinders for said pistons opening directly into the first mentioned cylinder and being arranged at an end of said first mentioned cylinder, and means connected with said pistons, said means providing a mechanical connection between said pistons and said brakes.

4. Brake mechanism of the class described including the combination of brakes, hydraulically actuated means for applying said brakes comprising a lever, a cylinder, a plunger in said cylinder actuated by said lever, a piston, a cylinder therefor having one end communicating with said plunger cylinder, an arm at the opposite end of said piston cylinder and having its ends attached to said brakes, said arm being connected to said piston, said attachment including a balanced member permitting operation of either brake upon failure of the other brake.

5. Brake mechanism of the class described including the combination of brakes, hydraulically actuated means for applying said brakes comprising a cylinder, a plunger in said cylinder, a piston operable by the pressure of a fluid in said cylinder upon forward movement of said plunger, an arm having its ends connected to said brakes, a member between said arm and said piston, and oppositely disposed balancing springs connected to said member on opposite sides of said piston.

6. Brake mechanism of the class described including the combination of four wheel brakes for a motor vehicle, hydraulically actuated means for applying said brakes, said means including a lever, a cylinder having a plunger operated by said lever, a pair of horizontally arranged pistons operating along axes substantially parallel to the axis of said plunger adjacent to one end of said cylinder, a pair of arms, said brakes being arranged to operate in pairs, each pair being connected to the ends of one of said arms, and a balanced member between each arm and piston permitting operation of either brake upon failure of the other brake.

CARL LEON EDDY.